United States Patent [19]

Dalisa et al.

[11] 4,203,106
[45] May 13, 1980

[54] X-Y ADDRESSABLE ELECTROPHORETIC DISPLAY DEVICE WITH CONTROL ELECTRODE

[75] Inventors: Andrew L. Dalisa, Yorktown Heights; Barry M. Singer, New York, both of N.Y.

[73] Assignee: North American Philips Corporation, New York, N.Y.

[21] Appl. No.: 854,117

[22] Filed: Nov. 23, 1977

[51] Int. Cl.$^2$ .................................................. G09F 9/32
[52] U.S. Cl. .................................. 340/787; 340/716; 340/763; 340/785; 350/362
[58] Field of Search ............ 340/336, 324 M, 324 R, 340/716, 763, 785, 787; 350/362

[56] References Cited

U.S. PATENT DOCUMENTS

| | | | |
|---|---|---|---|
| 3,892,568 | 7/1975 | Ota | 340/336 |
| 3,897,137 | 7/1975 | Dobbins | 350/362 |
| 4,046,456 | 9/1977 | Bonne | 350/362 |
| 4,071,430 | 1/1978 | Liebert | 350/362 |

Primary Examiner—Marshall M. Curtis
Attorney, Agent, or Firm—Thomas A. Briody; Jack Oisher; James J. Cannon, Jr.

[57] ABSTRACT

An electrophoretic display device in which an colloidal suspension of pigment particles is contained between a pair of electrodes, and means are provided in the structure of the electrodes of the cell for the establishment of a voltage threshold for the transport of pigment particles. This threshold permits the changing of the spatial distribution of pigment particles in specifically defined regions of the display cell.

10 Claims, 10 Drawing Figures

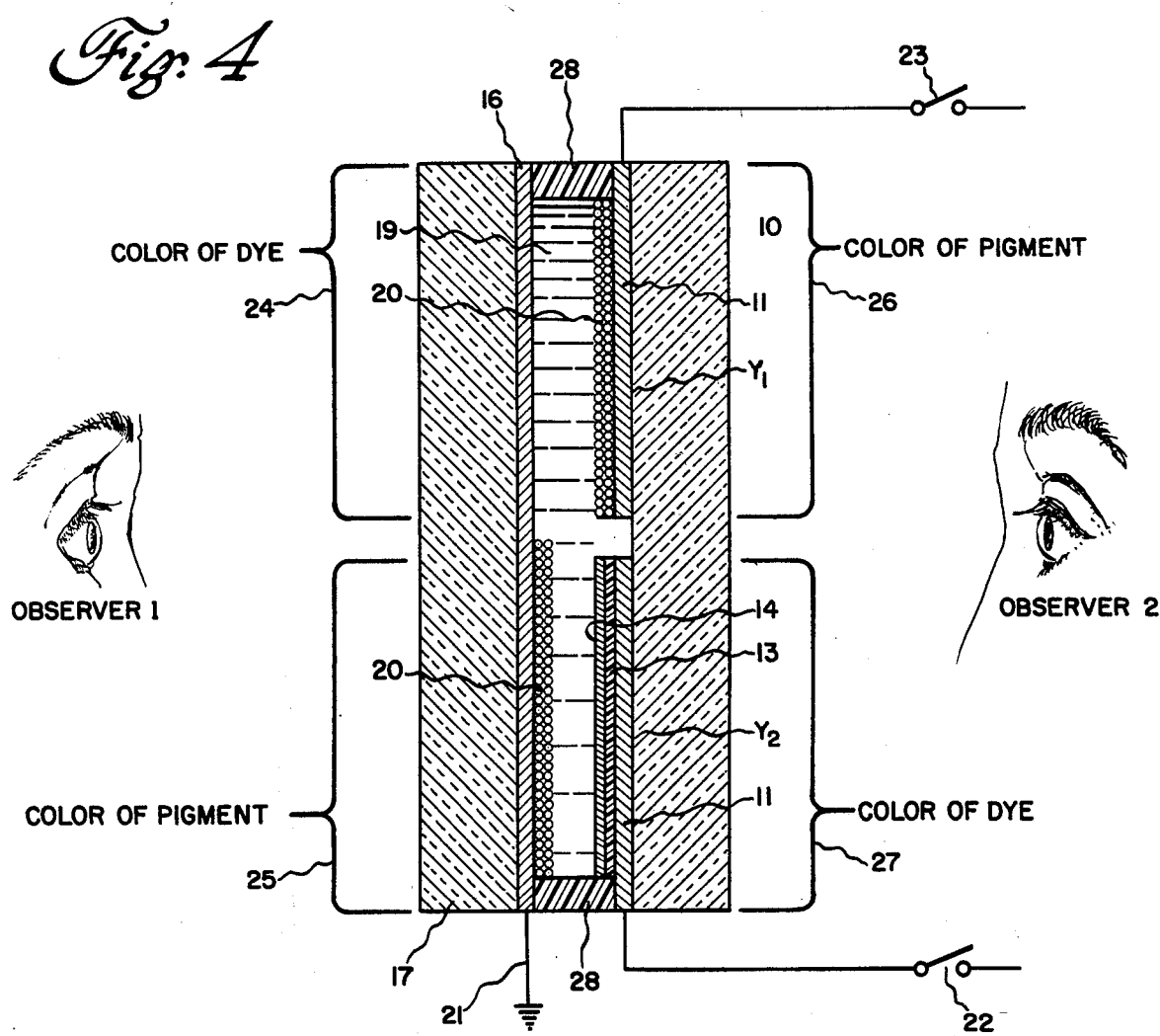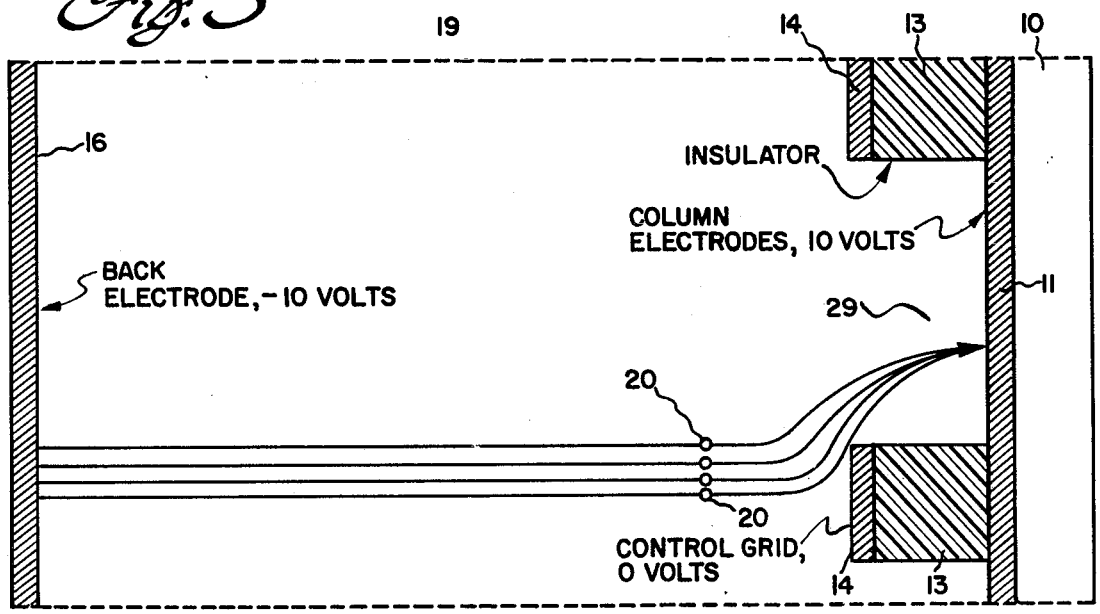

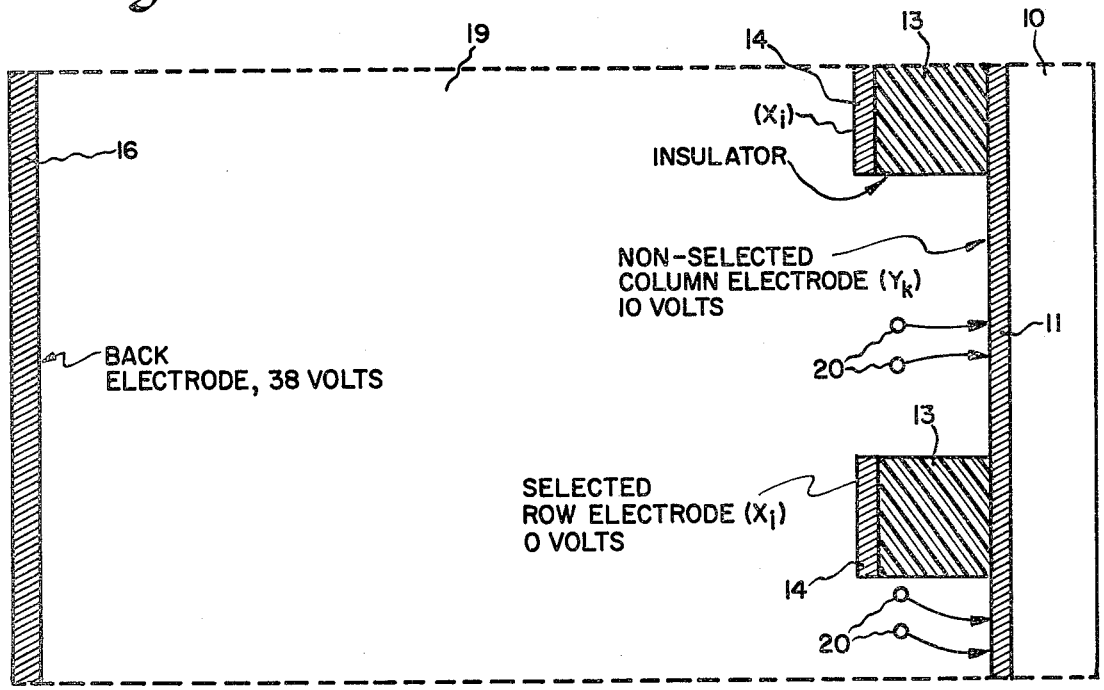
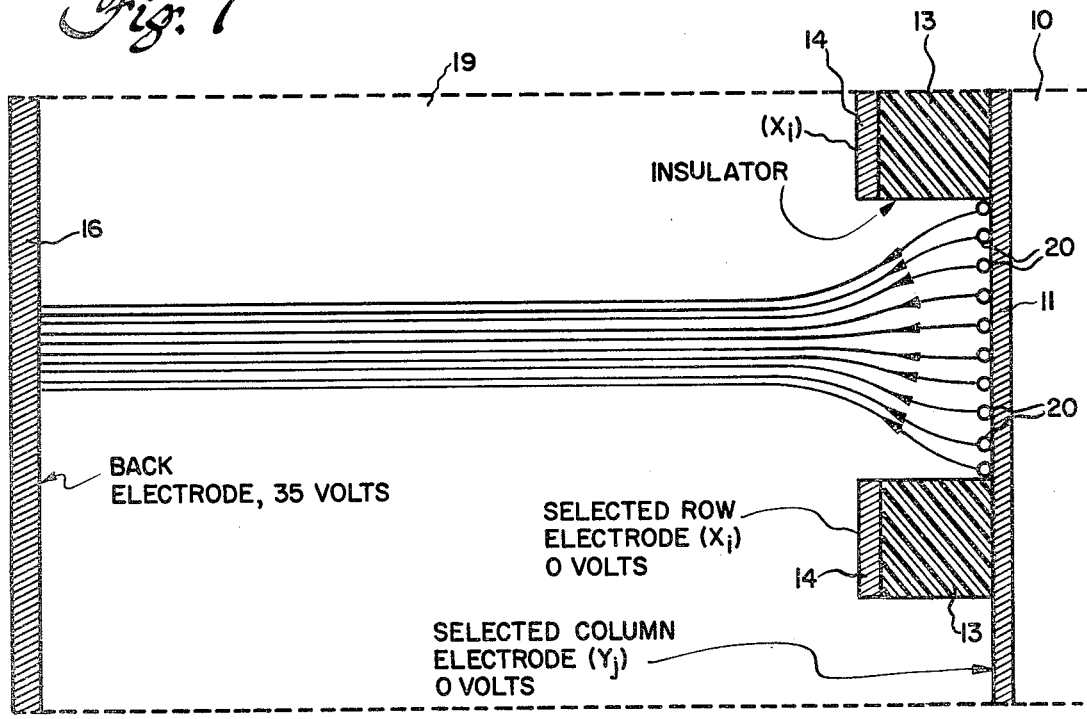

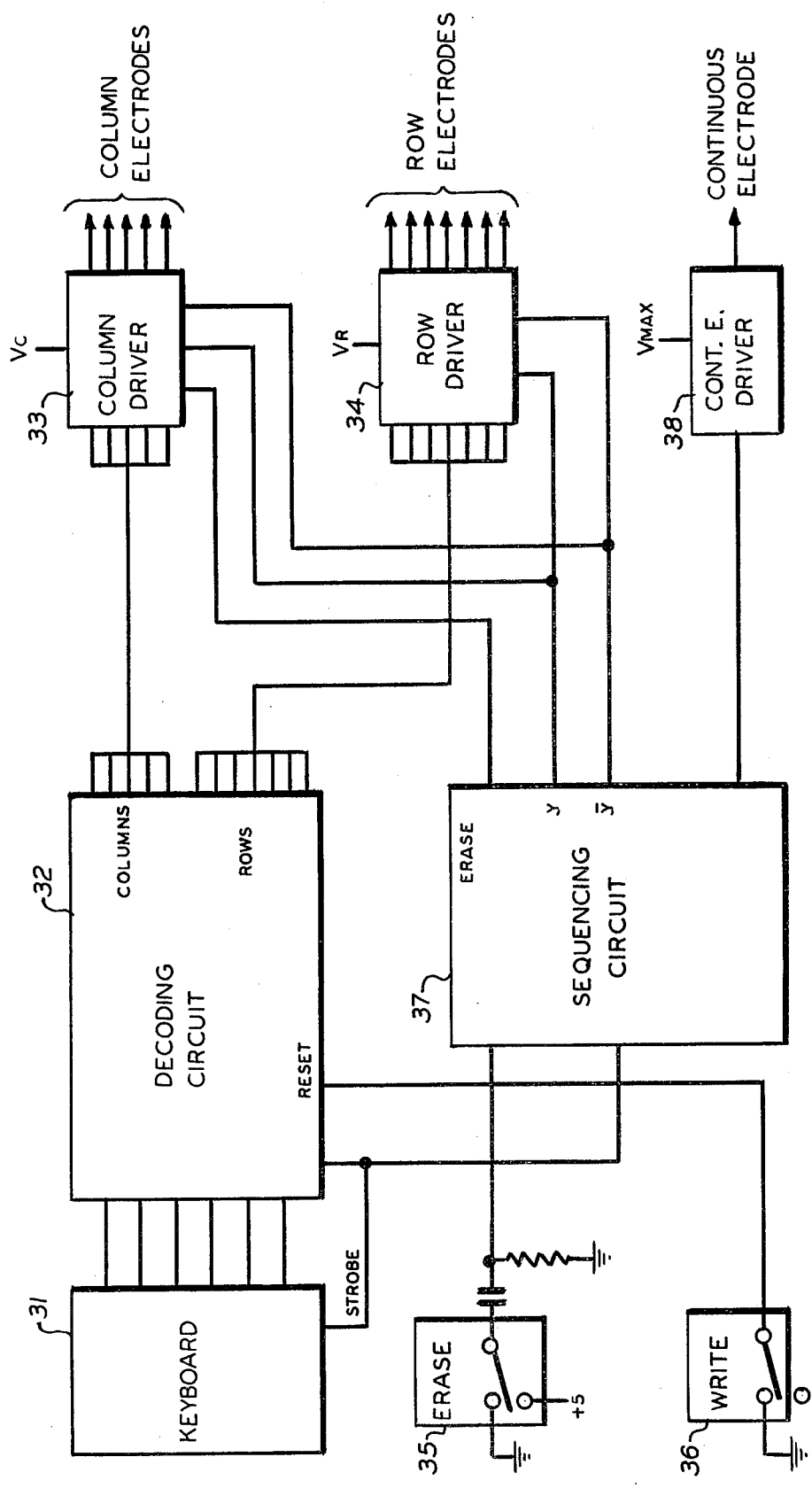

X-Y ADDRESSABLE ELECTROPHORETIC DISPLAY DEVICE WITH CONTROL ELECTRODE

BACKGROUND OF THE INVENTION

The invention relates to display and recording devices, particularly those in which images or patterns are formed by means of the electrophoretic migration of particles.

The use of the electrophoresis phenomenon for use in display devices containing an collidal suspension layer between electrodes is known in the prior art, such as represented by U.S. Pat. Nos. 3,612,758, 3,668, 106 and 4,071,430. These patents are hereby incorporated by reference to provide the basic information on the chemistry and technology of electrophoretic displays.

A simple electrophoretic image display (EPID) device is known, which is a passive, scattering-type display. This EPID device is implemented as a cell which consists of a suspension of pigment particles in an organic liquid held between two electrodes, at least one of which is transparent. In one embodiment, the pigment particles are negatively charged with respect to the liquid. If a positive potential is applied to an electrode in the suspension, the pigment particles will be attracted to that electrode. A negative potential on an electrode repels the particles.

One side panel of the device is made of a transparent material such as glass, coated with a transparent, electrically-conducting layer. When light-colored pigment is attracted to this side panel electrode, the observer looking at the panel sees the reflected color of the pigment. Due to the dark-colored dye in the suspending medium, the pigment at the back of the cell is obscured by the opaque dye and the observer sees only the reflected color of the dye. When the polarity of the voltage on the electrodes is reversed, the position of the colors is reversed. The described EPID display cell also possesses "memory" since the particles remain on the electrodes after the applied voltages are removed due to chemical, electrical, or van der Waals forces.

Such EPID devices described above are not practical for certain application since they lacked a fixed, specific switching threshold for the transport of pigment from one side of the cell to the other.

U.S. Pat. No. 3,612,758 suggests the use of an additional conductive layer for enhancing the threshold migration of pigment particles in the electrophoretic suspension. Although the patent alleges an effect of threshold migration of pigment particles, the disclosure admits that the exact mechanism for such an effect is not fully understood. If such an effect does exist (and there is no evidence from the prior art that it does), it would not be a natural threshold, nor would it be easily reproducible or lend itself to a commercial implementation for electrophoretic display devices. In addition, the lack of a sharp threshold characteristic will lead to slow addressing times and serious half-select problems. A half-select condition exists for those display elements that are not addressed but are on portions of a selected row or column electrode. These elements experience approximately half the applied voltage and in the case of this prior art, pigment in these elements would be partially transported across the cell, causing noticeable changes in the displayed information. Such disadvantages make the prior art suggestions for an X-Y addressing technique of electrophoretic display devices impractical.

In a paper entitled "Recent Progress In Electrophoretic Displays", by Andrew L. Dalisa and Roger A. Delano, and published in the "Digest of Technical Papers of the International Symposium of the Society for Information Display" held in San Diego, Calif. in May, 1974 a rudimentary control grid EPID cell was reported. The control grid, defined in the published report, was a "wire grid" positioned between and electrically isolated from the two electrode surfaces reported to be normally biased positive with a voltage with approximately ½ volt with respect to electrode A. The rudimentary configuration shown in the published paper (particularly FIG. 5) does not describe X-Y addressing, and moreover the structure of the relatively simple schematic diagrams shown in the paper does create an actual threshold but does not result in an easily reproducible or commercially implementatable electrophoretic display device. In short, the prior art configurations were impractical to implement X-Y addressing in electrophoretic display devices.

SUMMARY OF THE INVENTION

It is an object of the invention to provide an electrophoretic display and/or recording device which is X-Y addressable.

It is another object of the invention to provide means for switching and addressing display devices incorporating an electrophoretic suspension layer.

It is still another object of the invention to provide means within the suspension of electrophoretic material for changing the spatial distribution of the pigment.

It is yet another object of the invention to provide control and switching means for changing the spatial distribution of the pigment in an electrophoretic suspension so as to change the applicable reflective properties thereof.

It is another object of the invention to provide an electrophoretic color display device which has a low addressing voltage, and relatively rapid addressing time.

Another object of the invention is to provide an electrophoretic display device with storage of a fixed image after the switching current has been turned off.

One important feature of the present invention is an electrophoretic image display ("EPID") device which contains an opaque insulating fluid containing particles of at least one color pigment in suspension, essentially all such particles having a charge of one polarity. The device further includes a main first electrode, main second electrodes spaced from the first electrode, with the fluid disposed between the first and second electrodes. An insulating layer is adherently provided at least partially over the second electrode.

A control third electrode is interposed between the first and second electrodes, and separated from the second electrodes by the insulating layer, for selectively adjusting the electric field between the first and second electrodes to establish a threshold for transporting the particles, causing an image to be formed on the main electrodes by the presence or absence of the particles.

Another important feature of the invention is an electrophoretic display device having a first plurality of electrodes including spaced conductive elements insulated from each other. There is provided a dielectric fluid having pigment particles homogeneously dispersed therein; with a charge of the same polarity furnished to individual ones of the particles. The device includes a second electrode having conductors spaced from the first plurality of electrodes by the dielectric fluid. An electrical field is applied across selected ones of the first electrodes and the second electrode whereby charged particles migrate along the electric field electrophoretically in imagewise configuration to one of the electrodes.

The electric field between the first plurality and the second electrodes is adjusted for controlling the migrating particles.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 4 is a vertical cross-sectional view of a simple embodiment of an EPID cell according to the present invention having two rows;

FIG. 5 is a highly enlarged schematic representation of the movement of pigment particles during a "reset" operation;

FIG. 6 is a highly enlarged schematic representation of the movement of pigment particles within the physical well during a "hold-during-write" or "half-select" operation;

FIG. 7 is a highly enlarged schematic representation of the movement of pigment particles during a "write" operation;

FIG. 9 is a highly simplified block diagram of the decoding and driving circuits of EPID cells arranged in an X-Y matrix.

DESCRIPTION OF THE PREFERRED EMBODIMENTS

The electrophoretic image display (EPID) device according to the present invention is a passive, scattering-type display which has excellent brightness and contrast under normal ambient light levels. The high contrast is maintained over a very wide range of viewing angles (up to ±80°) as well as in bright ambient lighting.

Figure 1:
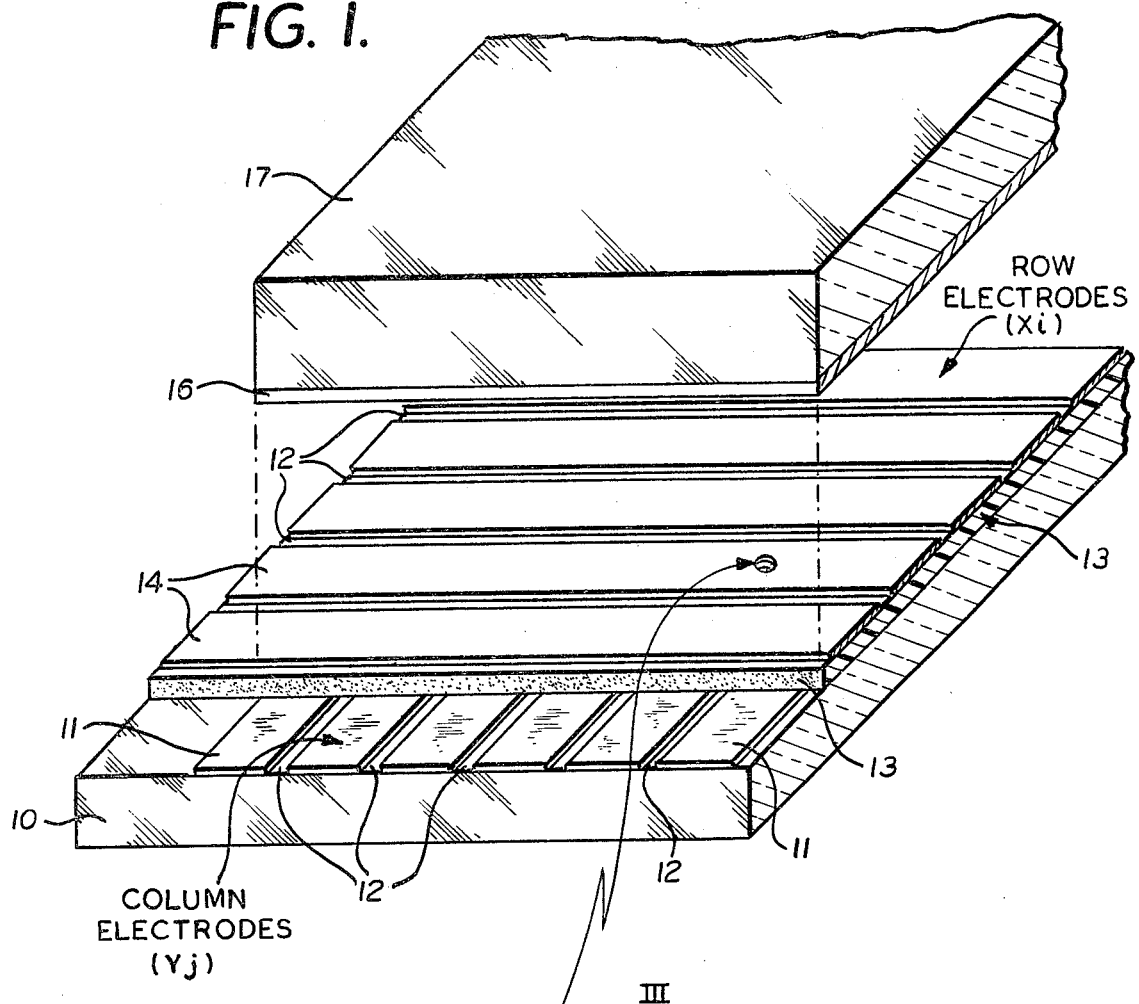
FIG. 1 is a cut-away perspective view of an EPID cell according to the present invention.

Turning now to FIG. 1 there is shown a cut-away, enlarged perspective view of an EPID device according to the present invention. FIG. 1 serves not only to show the configuration of the device, but also its method of construction.

As shown in FIG. 1, an EPID device is constructed starting from a flat first panel or substrate 10 composed of glass or transparent plastic about 1.5 mm thick. The substrate 10 is provided with a plurality of parallel transparent conductive strips adherent to a major surface of the panel which serve as column electrodes 11. These column electrodes 11 are composed of indium oxide typically applied to the panel 10 by means of sputtering. In the present embodiment, the column electrodes 11 are typically 3000 Å thick and have a width of 2.5 mm. The length of the column electrodes 11 depends upon the extent and size of the display device itself.

The substrate 10 and the column electrodes 11 are then covered with an insulating layer 13 composed of a photoresist or other dielectric from 5 to 50 μm thick and which is applied by the process of dip coating. A plurality of row electrodes 14 are then adherently applied to the upper surface of the insulating layer 13 in the form of parallel strips extending transversely to the column electrodes. The row electrodes 14 are composed of aluminum, are applied to the insulating layer 13 by means of vacuum evaporation, and are separated at least in part from the column electrodes 11 by the insulating layer. The electrodes 14 have a thickness of about 700 Å, and a width of 2.5 mm. The interelectrode spacing 12 of the row electrodes is similar to that of the column electrodes, i.e., from 25-100 μm.

Figure 2:
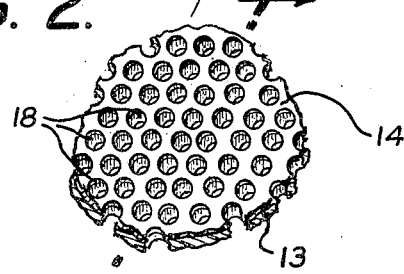
FIG. 2 is an enlarged perspective view of a portion of a row electrode and insulator of an EPID cell shown in FIG. 1.

In one embodiment of the invention, the row electrodes 14 and insulating layer 13 are patterned into minute pockets or holes 18 which are shown in the enlarged portion illustrated in FIG. 2. Such holes 18 are not shown in FIG. 1 to avoid cluttering the drawing.

The holes 18 are formed after the row electrodes 14 are deposited by vacuum evaporation. First, a layer of photoresist (not shown) is applied over the row electrodes 14. A mask having the desired pattern of pockets or holes is applied over the top layer of photoresist, and the photoresist is exposed. The mask is removed, and the photoresist developed, leaving a perforated layer exposing portions of the underlying row electrodes 14.

An aluminum etching solution is then applied to the patterned photoresist layer, removing the exposed portions of the row electrodes 14, and uncovering portions of the insulating layer 13 underneath. The remaining top layer of photoresist is then removed according to standard techniques known in the art, exposing the perforated row electrodes 14.

Next, the insulating layer 13 beneath the perforations in the row electrodes 14 must be removed. In the embodiment in which the insulating layer 13 is a photoresist, the process is simple: the perforated row electrodes 14 serve as the exposure mask. The insulating photoresist layer 13 is then exposed and developed (i.e. dissolved), thereby forming corresponding pockets 18 beneath the perforations in the row electrodes 14. Such pockets 18 extend down to column electrodes 11.

A second panel 17 is provided parallel to the first panel 10. The panel 17 has a plane major surface facing the first panel 10 which is coated with an electrode layer 16. The electrode layer 16 is a continuous transparent electrode layer of indium oxide about 3000 Å thick adherent to the panel 17 and applied by the process of sputtering. The spacing between the continuous electrode and the control or row electrodes is approximately 40 μm. The end portions between panels 10 and 17 are sealed (shown in FIG. 4) so that a fluid may be contained therebetween.

The region between the column electrodes 11 and the continuous electrode 16 is filled with an "electrophoretic fluid", such as a colloidal suspension (19 in FIG. 4) comprised of a dielectric fluid such as xylene and perchlorethylene, a soluble dye, and colored pigment particles, homogeneously dispersed therein. This suspension is more generally referred to throughout the specification and claims as an "electrophoretic fluid". All particles in the suspension have a charge of one polarity which is achieved by the addition of charging agents to the liquid. The operation of the configuration shown in FIG. 1 as a display device will be explained in more detail with reference to FIG. 4.

FIG. 2 is an enlarged portion of the insulator 13 and row electrode 14. The row electrode and insulator 13 are shown to be photolithographically patterned into a dense array of holes 18.

The holes 18 may be any shape, but are shown as circular in FIG. 2 for simplicity. In later Figures, which depict a cross-sectional view, the holes 18 are assumed to be square, again to simplify the representation. The holes 18 are each typically about 20 $\mu$m square or 20 $\mu$m in diameter, or more generally from 10 to 50 $\mu$m in dimension. The center-to-center distance between the perforations is from 15 to 60 $\mu$m. The holes 18 extend completely through the row electrode and insulator material, and expose the column electrodes 11 to the electrophoretic fluid, so that the row electrodes 14 serve as a control grid. The holes 18 therefore form pockets or cavities which serve as physical wells into which the pigment particles are able to migrate depending upon the electric fields present. The holes 18 cover at least 50% and more typically 60–70% of the row electrode surface.

Figure 3:
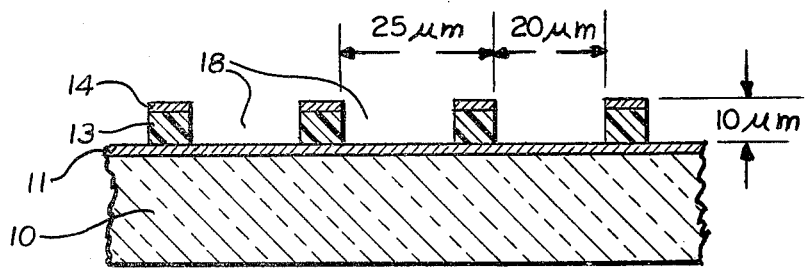
FIG. 3 is a cross-sectional view of an EPID cell in the III—III plane shown in FIG. 2.

FIG. 3 is an enlarged cross-sectional view of the row portion illustrated in FIG. 2 shown in the III—III plane. The column electrode 11 is shown to be a continuous layer in this cross section extending over the panel 10. The insulator 13 and the portion of the row electrode 14 are adherently provided thereon forming the potential wells or pockets 18.

FIG. 4 is a cross-section of a simplified electrophoretic image display cell according to the present invention having two row electrodes 14. There is shown the substrate 10, two column electrodes 11, labelled $Y_1$ and $Y_2$ the insulating layer 13 and the row electrodes 14. The second panel 17 is parallel to the substrate 10 for confining the electrophoretic fluid 19 therein. The continuous or back electrode 16 is adherently attached to the second panel 17. A spacer or seal 28, which may be a synthetic plastic material, is also shown for sealing and confining the electrophoretic fluid 19 within the device between the substrate 10 and the panel 17.

The pockets 18 are not shown in FIG. 4 in order to simplify the drawing. The pigment particles 20 are represented as being attracted into the pockets 18 in the upper portion of the cells, and attracted to the back electrode 16 in the lower portion of the cell. The corresponding row electrode 14 and insulating layer 13 are not shown in the upper portion of the cell where the pigment particles are attracted in order to simplify the drawing. Furthermore, the relative thickness of the electrodes or layers depicted are not to scale.

The electrical configuration for operation of a display cell is also shown in highly schematic form. The continuous electrode 16 is shown to be grounded at 21 for simplicity. In other operational modes, a positive or negative voltage may be applied to the back electrode. The first column electrode $Y_1$ is shown connected to a first switch 23, and the second column $Y_2$ is connected to a second switch 22. The connection of the row electrodes 14 to sources of potential is not shown in FIG. 4 in order to simplify the drawing. By changing the polarity of the row and column electrodes in a manner to be fully described later, the particles of pigment 20 will be attracted or repelled from back electrode 16 or column electrodes 11, thereby forming the desired image in the appropriate regions of the cell.

The visual effects of the EPID operation is shown in highly schematic form in FIG. 4. Either side of the EPID device may be used for display, as is shown by the placement of observer 1 and observer 2. Observer 1 sees the color of the dye through transparent first portion 24 of the display second panel 17 since the electrophoretic fluid 19 is opaque and obscures the pigment particles. On the second portion 25 of the panel, the pigment particles 20 have displaced the dye in the region of the transparent electrode 16, so the observer 1 sees the color of the pigment particles 20 through the second portion 25 of the display panel. In one embodiment of the invention a light colored yellow pigment is used. The display cell possesses "memory" since the pigment particles remain on or adjacent to the electrodes when the applied voltages are removed due to electrical, chemical and van der Waals forces.

Observer 2 sees the color of the pigment through the upper portion 26 of the substrate 10. On the lower portion 27 of the substrate, the opaque dye lies adjacent to the substrate 10, so the observer 2 sees the color of the dye through the substrate.

FIGS. 5, 6 and 7 depict the movement of pigment particles in an electrophoretic image display device during "reset", "hold-during-write" and "write" operations of a single EPID cell corresponding to a particular row and column. The FIGS. 5, 6 and 7 show in highly schematic form a highly enlarged view of the back electrode 16, the electrophoretic fluid 19, the pigment particles 20 as they move through the fluid under influence of electric fields (depicted by arrows), a portion of a single control or row electrode 14, the insulating layer 13 (not to scale), a portion of a single column electrode 11, and the substrate 10.

FIGS. 5, 6 and 7 particularly illustrate the trajectories of pigment particles 20 in the electrophoretic fluid 19 along electric field lines with various predetermined voltages applied to the back electrode 16, control or row electrodes 14, and the column electrode 11, based upon theoretical calculations using the device geometry (i.e., thickness of insulating layer 13; and diameter, depth, and separation of the physical wells 29) presented in the embodiment of FIG. 1, and simulations of particle motion under external fields performed on a computer.

FIG. 5 shows the "reset" operation. In this configuration we assume that the pigment particles 20 have previously been located on or closely adjacent to the back electrode 16 in a display operation. In order to display new information, the first step is to erase or "reset" the cell by moving all the pigment particles 20 into the holes 18, represented here by physical wells 29. In this operation, and in the operations presented in FIGS. 6 and 7, we assume that the pigment particles 20 are negatively charged, such as by techniques discussed in U.S. Pat. No. 3,612,758 incorporated by reference.

During the reset operation the column electrodes 11 (which are at the bottom of the physical wells 29) are set to a positive potential of, for example, 10 Volts. The control or row electrode 14 is set to a voltage approximately the same as the column potential i.e. 10 Volts. The continuous or back electrode 16 is pulsed to a negative voltage, for example −10 Volts. For applications requiring higher speed the voltages can be increased. The net effect is that the pigment particles 20, as shown in FIG. 5, move along trajectories from the back electrode 16 into the physical well 29 to a region adjacent the transparent column electrode 11.

During X-Y addressing, the row and column corresponding to a display element to be activated is "selected" by applying a predetermined voltage to such row and column. Other display elements in the "selected" row or "selected" column are not intended to be activated, and thus are required to remain in their previous state. These display elements must therefore respond to such a "half-select" condition by a "hold" configuration. The "half-select" configuration is therefore also sometimes called a "hold-during-write" configuration.

FIG. 6 shows the "hold-during-write" or "half-select" configuration, in which during X-Y addressing of the array of EPID cells the depicted column electrode 11 (here designated $Y_k$) is not selected, while the depicted row electrode 14 (here designated $X_i$) is selected. In this "half-select" condition, the pigment particles 20 are kept within the physical wells 29. As pointed out above in the discussion of prior art the ability to implement a "half-select" condition is very significant for implementing X-Y addressing. In the half-select condition, the display elements which are not to be written but which lie along a selected row or column electrode are provided with a 10 Volt potential difference between the row and column electrodes 14 and 11. This potential difference is sufficient to constitute a hold condition and the pigment particles 20 in such half selected elements will remain in the wells, just as shown in FIG. 6.

During the "half-select" operation, the back electrode 16 is set to a positive switching voltage, for example, 38 Volts. The 10 Volt potential difference between the control electrodes 14 and the column electrodes 11, establishes an electric field which confines the pigment particles 20 to the wells 29. Note that the two pigment particles 20, representative of particles within one of the potential wells 29, experience a force directing them deeper into the well.

In the write operation shown in FIG. 7, the desired row and column electrodes corresponding to a region to be written upon are pulsed to the same voltage, or with the control or row electrode pulsed more positive than the column electrode, thereby eliminating or reversing the electric field which confines the pigment particles 20 to the physical wells 29. The pigment particles 20 are transported across the cell by the back electrode 16 potential of 35 Volts. The pigment particles 20 therefore collect against the back electrode 16 in the region corresponding to the intersecting row and column electrodes. The XY selected display element now shows the color of the pigment particles against the back electrode 16 and the color of the electrophoretic dye against the front substrate 10.

The control electrode 14 according to the present invention can therefore be used to select and write any desired element in an XY matrix without effecting any of the other display elements. It is pointed out that the addressing time for any of the display elements is the time required for the pigment particles 20 to move from the bottom surface of the potential wells 29, to a point above the control electrode. It is not necessary for one to wait for the particles 20 to migrate the entire thickness of the cell before selecting and writing other elements in the display.

Some of the other operational specifications of the EPID device according to the present invention are as follows:

| *Contrast Dye | Contrast |
|---|---|
| Black/White | 10:1 |
| Red/Yellow | 36 (1964 CIE Standard from H. Panli, JOSA 66, 866, (1976)) |
| *Viewing Angle | ±80° |
| *Power Requirements | 20 uW/cm$^2$ |

Figure 8A:
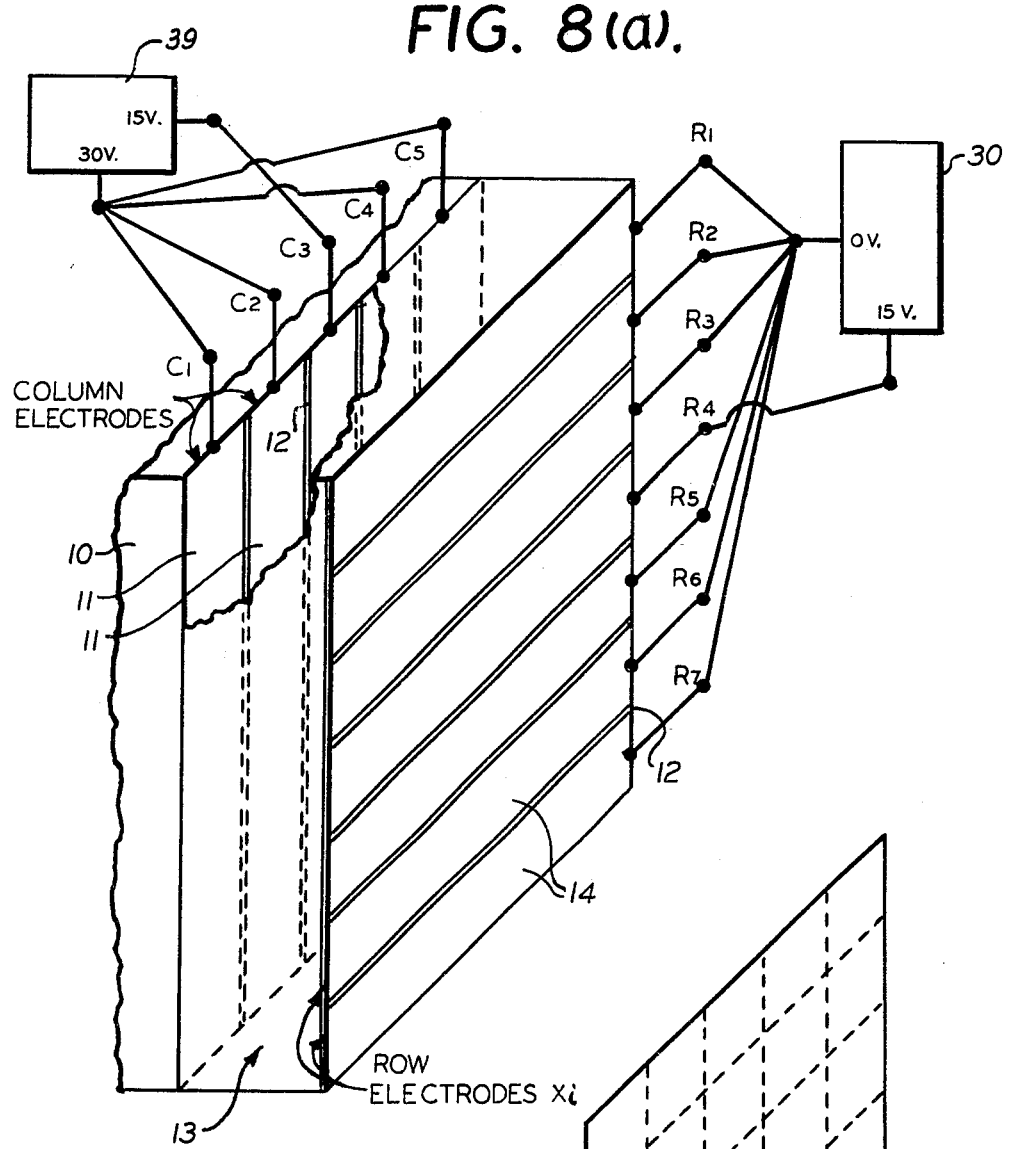
FIGS. 8a and b are highly simplified schematic diagrams of the X-Y addressing of a plurality of EPID display elements according to the present invention.

FIGS. 8a and b are highly simplified diagrams of the X-Y addressing of a plurality of display elements according to the present invention.

FIG. 8a shows the connection of EPID cells or display elements to voltage sources 30 and 39. The particular connection shown in the Figure is designed for activation for the display element at the intersection of the fourth row and third column [$R_4C_3$].

Figure 8B:
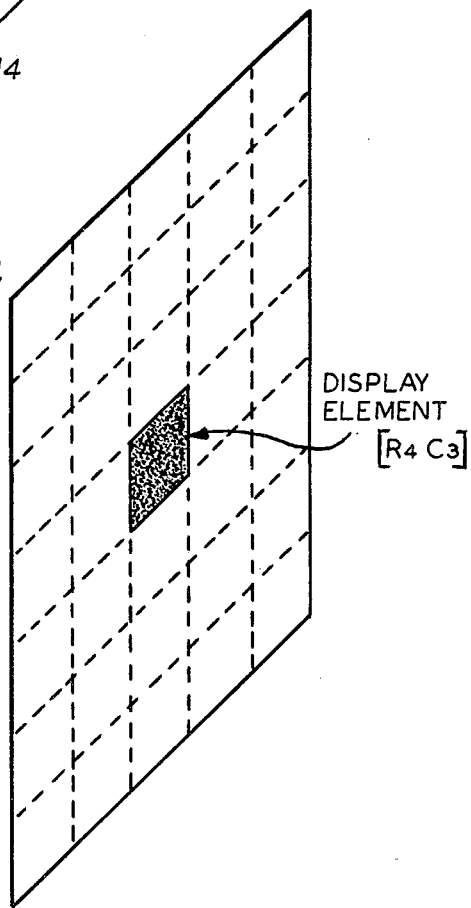

FIG. 8b more graphically indicates the result of the activation of the selected display element [$R_4C_3$]. The dashed lines on the imaging surface are shown for reference only. In order to form the image of a character on the display, one technique is to scan each of the display elements and successively activate appropriate display elements during the scan to form the desired character. For a limited number of lines, since the display elements are scanned faster than is observable to the eye, the eye integrates over each element activated and the entire character composed of a plurality of activated display elements appears to be imaged on the display simultaneously.

FIG. 9 is a highly simplified block diagram of decoding and driving circuits for the EPID cell which may be used in one embodiment according to the present invention. The user enters the character he wishes to display on a keyboard 31. A decoding circuit 32 is connected to the keyboard 31 for decoding the character specified on the keyboard and activating specific rows and columns of an XY display. An output of the decoding circuit designating the specific columns is connected to the column driver 33 which drives the appropriate column electrodes of the EPID cell. Another output of the decoding circuit which designates the specific rows is connected to the row driver 34 which in turn drives the appropriate row electrodes of the EPID cell.

The erase and write function switches, 35 and 36, for resetting and activating the EPID cell are connected to a sequencing circuit 37. The sequencing circuit 37 provides appropriate signals to the column and row drivers 33 and 34 so that such drivers are activated in correct sequence. The sequencing circuit 37 is also connected to a continuous electrode driver 38 for activating the continuous or back electrode of the EPID cell.

While the invention has been illustrated and described as embodied in an electrophoretic colloidal suspension panel display device with X-Y addressing, it is not intended to be limited to the details shown, since various modifications and structural changes may be made without departing in any way from the spirit of the present invention. The EPID cell geometry, electrophoretic fluid, voltages used, and method of addressing and writing information on the display are purely exemplary.

The foregoing embodiments present the gist of the present invention so that others can, by applying current knowledge, readily adapt it to other geometries, fluids, voltages, addressing methods, and applications, without omitting features that, from the standpoint of prior art, constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An X-Y addressable electrophoretic display device comprising:
    a first transparent panel serving as a substrate, one side of which is an exterior viewing side of said display;
    a first plurality of spaced apart parallel transparent conductive strips adherent to a major portion of the interior surface of said first panel, said conductive strips serving as column electrodes;
    a dielectric insulating layer covering said column electrodes;
    a second plurality of spaced apart parallel conductive strips extending transversely to said column electrodes, said second plurality of conductive strips adhering to the other surface of said dielectric insulating layer and serving as row electrodes and as control electrodes;
    a plurality of substantially uniformly spaced minute performations in said row electrodes and said dielectric insulating layer;
    a second transparent panel corresponding in size to and substantially parallel with said first panel and in spaced apart registration therefrom, one side of which forms an exterior viewing side of said display and the other side of which has an interior plane surface facing the interior side of said first transparent panel;
    the interior side of said second transparent panel having a transparent conductive layer adhered thereon forming one continuous electrode layer;
    sealing means to enclose the space between said first and second transparent panels, forming a region therebetween;
    said enclosed region between said panels being filled with an electrophoretic fluid having pigmented particles homogeneously suspended therein, said particles capable of receiving an electrical charge;
    means for furnishing an electrical charge to said pigmented particles;
    means to supply voltages to said column electrodes, row electrodes and continuous electrode such that the electrical field between said electrodes can be selectively adjusted by the varying voltages on addressed column electrodes and row electrodes and said continuous electrode to establish a threshold on said row electrodes for transporting said charge particles between said continuous electrode and said addressed column electrodes, depending on the direction of the electrical field, resulting in an image to be formed in the addressed intersection regions corresponding to said addressed column electrodes and row electrodes of said display panel.

2. A device as claimed in claim 1, wherein said insulating layer is from 5 $\mu$m to 50 $\mu$m thick.

3. A device as claimed in claim 1, wherein said perforations have a dimension from 10 to 50 $\mu$m.

4. A device as claimed in claim 1, wherein the center-to-center distance between said perforations is from 15 to 60 $\mu$m.

5. A device as claimed in claim 1, wherein said perforations constitute over 50% of the surface area of said insulating layer.

6. A device as claimed in claim 1, wherein said pigment particles migrate from addressed column electrodes to said continuous electrode at a point corresponding to an addressed intersection of said column electrodes and said row electrodes.

7. A device as claimed in claim 1, wherein a character may be formed on said display panels by the addressing of a plurality of intersections of row and column electrodes through the application of appropriate voltages to cause pigment particle migration.

8. A device as claimed in claim 1, wherein said row electrodes are formed from a layer adherently provided on the upper surface of said insulating layer.

9. The apparatus of claim 1 comprising a multilayer row electrode structure overlying said plurality of column electrodes whereby the threshold for particle migration is established.

10. The device as claimed in claim 1, wherein said particles have the capability of adhering to said electrodes in imagewise configuration after the removal of said source of potential.

* * * * *